United States Patent [19]

Tanaka

[11] Patent Number: 5,590,302
[45] Date of Patent: Dec. 31, 1996

[54] DEVICE FOR GENERATING STRUCTURED ADDRESSES

[75] Inventor: Koichi Tanaka, Kawasaki, Japan

[73] Assignee: Kabushiki Kaisha Toshiba, Kawasaki, Japan

[21] Appl. No.: 487,700

[22] Filed: Jun. 7, 1995

Related U.S. Application Data

[63] Continuation of Ser. No. 935,095, Aug. 26, 1992, abandoned.

[30] Foreign Application Priority Data

Aug. 26, 1991 [JP] Japan ............................ 3-213676

[51] Int. Cl.$^6$ ............................................. G06F 12/10
[52] U.S. Cl. ........................................ 395/416; 395/421.1
[58] Field of Search .................... 395/421.1, 421.09, 395/410, 418, 416

[56] References Cited

U.S. PATENT DOCUMENTS

| | | | |
|---|---|---|---|
| 4,959,770 | 9/1990 | Kondo et al. ........................ | 395/413 |
| 5,109,334 | 4/1992 | Kamuro ................................ | 395/416 |
| 5,150,471 | 9/1992 | Tipon et al. ........................ | 395/421.1 |
| 5,347,643 | 9/1994 | Kondo et al. ...................... | 395/421.01 |

*Primary Examiner*—Eddie P. Chan
*Assistant Examiner*—Reginald G. Bragdon
*Attorney, Agent, or Firm*—Foley & Lardner

[57] ABSTRACT

A device for generating structured addresses indicating an address position in a memory to be accessed. This device comprises first and second structured address generating devices and receives address data having a first address of i bits (i>0), a second address of n bits (n>0), and a control bit. The first structured address generation device receives the first address and a page address of m bits (m>0) corresponding to the address data and adds the high order k bits (i>k>0 and m>k>0) of the first address to the low order k bits of the page address to generate a first structured address of n bits comprising high-order m-k bits made from the high order m-k bits of the page address, intermediate order k bits made from a result of the addition, and low-order i-k bits made from the low order i-k bits of the first address. The second structured address generation device selects either the first structured address or the second address based on the control bit to generate a second structured address which is transmitted to the memory.

7 Claims, 7 Drawing Sheets

FIG.1

ADDRESS
(HEXADECIMAL DISPLAY)

| Address | Field | |
|---|---|---|
| 0 | LINE NO. (1) | ⎫ |
| 1 | REMOTE STATION ADDRESS | ⎪ |
| 2 | REMOTE STATION PORT NO. | ⎪ |
| 3 | LOCAL STATION PORT NO. | ⎬ DATA STRUCTURE FOR CONTROLLING ONE COMMUNICATION LINE (16 WORDS=1 PAGE) |
| 4 | TRANSMISSION SEQUENCE NO. | ⎪ |
| 5 | RECEPTION SEQUENCE NO. | ⎪ |
| ⋮ | ⋮ | ⎪ |
| F | | ⎭ |
| 10 | LINE NO. (2) | |
| 11 | REMOTE STATION ADDRESS | |
| 12 | REMOTE STATION PORT NO. | |
| 13 | LOCAL STATION PORT NO. | |
| 14 | TRANSMISSION SEQUENCE NO. | |
| 15 | RECEPTION SEQUENCE N0. | |
| ⋮ | ⋮ | |
| 1230 | LINE NO. (124) | |
| 1231 | REMOTE STATION ADDRESS | |
| 1232 | REMOTE STATION PORT NO. | |
| 1233 | LOCAL STATION PORT NO. | |
| 1234 | TRANSMISSION SEQUENCE NO. | |
| 1235 | RECEPTION SEQUENCE NO. | |
| ⋮ | ⋮ | |
| 123F | | |
| 1240 | | |

FIG.2

FIGURE FOR EXPLAINING PRINCIPLE OF
THE PRESENT INVENTION

FIG.4

ADDRESS
(HEXADECIMAL DISPLAY)

| Address | Content |
|---|---|
| 0 | LINE NO. (1) |
| 1 | REMOTE STATION ADDRESS |
| 2 | REMOTE STATION PORT NO. |
| ... | ... |
| 12 | USER'S NAME |
| ... | |
| 3F | |
| 40 | LINE NO. (2) |
| ... | ... |
| 8C0 | LINE NO. (24) |
| 8C1 | REMOTE STATION ADDRESS |
| 8C2 | REMOTE STATION PORT NO. |
| ... | ... |
| 8D2 | USER'S NAME |
| 8FF | |
| 900 | |

DEVICE FOR GENERATING STRUCTURED ADDRESSES

This application is a Continuation of application Ser. No. 07/935,095, filed Aug. 26, 1992 now abandoned.

BACKGROUND OF THE INVENTION

1. Field of the Invention

The present invention relates to a device for generating addresses which generates addresses when accessing a memory device in a data processing device, and, in particular, to a device for generating structured addresses wherein a plurality of data items with the same data configuration such as control data for a communication line is stored in a memory device, so that addresses can be conveniently calculated when processing these data items by a same program.

2. Description of the Prior Art

In a communication device for controlling a plurality of communication lines such as communication networks, data for managing the state of the individual communication lines exists independently, but there are many cases where a homogeneous data structure is adopted to format this data for easy programming.

Figure 1:
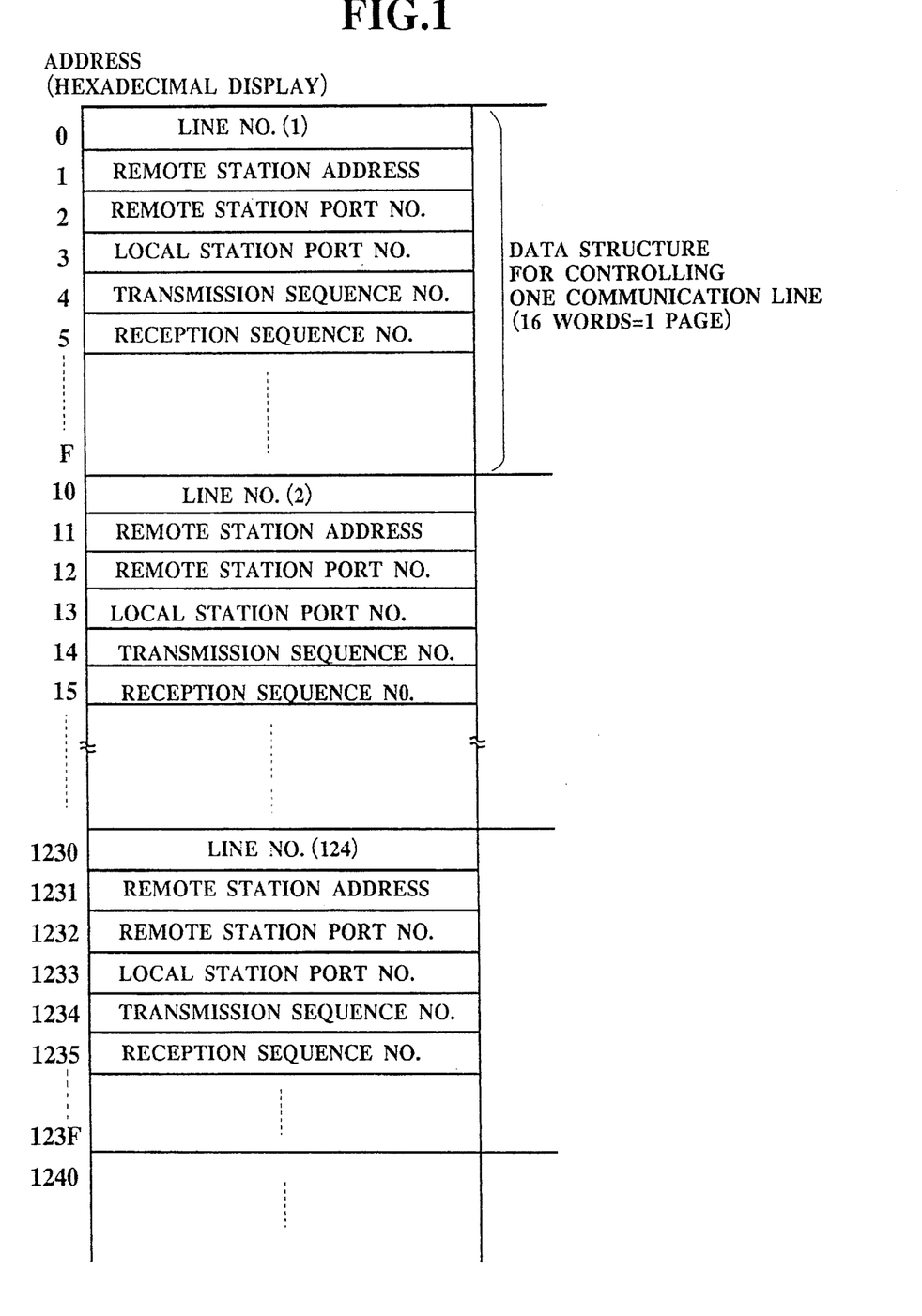
FIG. 1 is a chart for explaining a first example of an embodiment of a control data structure of the present invention.

An example of this type of data structure is shown in FIG. 1. In the data structure in this figure, it is possible to determine a specific communication line by combining three types of data items—the physical address and the logical port number of the remote station, and the logical port number of the local station. To detect duplicating and truncating of data or the like, when transmitting or receiving data using this communication line the transferred/received data is controlled by providing respective sequence numbers. In addition, this data has an inherent value for each communication line, and has the characteristic that the data structure is the same.

For programming using this data structure, it is possible to specifically set data as a base address for the managed data and use an offsetting technique.

For such a purpose, an Intel 18086 processor for example, where a memory device is accessed through physical (hardware) calculations by adding a direct value showing an offset, or a register value to a register indicating a base address.

With this type of conventional general purpose processor, i.e. the Intel 18086, this addressing mode is used to expand address space, and an arithmetic operations unit or a computing element with enough bits to cover the total address range is used. For this reason, there is the problem that the time required for the Calculations is one clock cycle at least and, as a result, data access is slow.

Also, in the Application Specific Integrated Circuit (ASIC) technique in which circuits which implement peripheral devices, and specialized processors are provided on a semiconductor substrate, the above-mentioned type of computing element dedicated to address calculation cannot be provided in order to minimize the amount of hardware, and the data computing element must serve double duty. In this case, the calculations are made by the program, whenever the data is accessed, and the offset must be added to the base address. The number of steps is therefore increased and the execution time is also increased. Elimination of these drawbacks is therefore desired. In addition, in a processor which uses a. microcode, the execution time for calculating addresses in the microcode cannot be reduced even though the number of steps is reduced in the program used.

Furthermore, when access is made with an incorrect offset caused by an error in the program, a different data structure is accessed, and, as a result it frequently occurs that data is destroyed during program development. Unexpected destruction of data address makes debugging difficult, and therefore a program which restricts the range of addresses accessed is desirable. However, with conventional addressing, the range of physical addresses is increased because the total address range indicated by the offset address on the base address as standard is effective, and it is difficult to limit incorrect addresses by hardware means. Accordingly, in order to access this type of specific data structure, the program must check address addition and range, which increases the processing time with a conventional processor.

As outlined above, conventionally, a computing element with enough bits to cover the total address range is used, and the time required for the calculations is at a minimum, one clock cycle, and as a result data accessing is slow. Additional problems are that, even in the case where the computing element serves double duty, the number of steps is increased and the execution time is also increased in the calculations by the program. A further problem is that even in a processor which uses a microcode, although the number of steps is reduced in each program used, the execution time for calculating addresses in the microcode cannot be reduced. Further, it is difficult to limit incorrect addresses by hardware means, and in order to access this type of specific data structure, the program must check address addition and range, which increases the processing time.

SUMMARY OF THE INVENTION

An object of the present invention is to provide, with due consideration to the drawbacks of such conventional devices, a device for generating structured addresses wherein when a plurality of items of data with the homogeneous configuration are processed, address addition within a processor such as a network control processor is made unnecessary by adding a base address to addresses created by the processor, and by using a process in which the address is transferred from the processor to a memory device, there is substantially no time delay in the address addition, also, by restricting the address addition range, incorrect addresses are not accessed, and the device can flexibly cope with the size of the data structure.

The object of the present invention is achieved by the provision of a device for generating structured addresses indicating address in a memory means, which inputs address data being made up of a first address data and a second address data, comprising: a page address maintenance means for maintaining the head address of each page under the control of the first address data when the memory means is divided into a plurality of pages; a first structured address generation means for generating a first structured address under the control of the first address data and of the head address maintained in the page address maintenance means; and a second structured address generation means for selecting either the output from the first structured address generation means or the second address data as a second structured address and for outputting the selected data to the memory means under the control of the address data.

The object of the present invention is further achieved by the provision of a device for generating structured addresses according to claim 1, wherein the page address maintenance means comprises m (an optional positive integer) bits (high-order m-k bits, low-order k (an optional positive integer) bits); the first address data comprises i (an optional positive integer) bits (high-order k bits, low-order i-k bits); the first structured address comprises n (an optional positive integer) bits (high-order m-k bits, intermediate order k bits, low-order i-k bits); and wherein the first structured address generation means generates high-order m-k bits from the high-order m-k bits of the page address maintenance means, intermediate-order k bits from the additive result of the low-order k bits of the page address maintenance means and the high-order k bits of the first address data, and low-order i-k bits from the low-order i-k bits of the first address data.

In the device for generating structured addresses of the present invention, the first structured address generation means generates the high-order m-k bits of the page address maintenance means as high-order m-k bits; generates the additive result of the low-order k bits of the page address maintenance means and the high-order k bits of the first address data as intermediate-order k bits; and generates the low-order i-k bits of the first address data as low-order i-k bits. The second structured address generation means selects the output of the first structured address generation means by accessing the first address data, and selects the second address data by accessing the second address data.

Accordingly, when processing a plurality of data items with the same data structure, adding a base address to addresses created by a processor makes address addition within the processor unnecessary. Furthermore, because it is possible to add by means of a process in which the address is transferred from the processor to a memory device, there is substantially no time delay from the address addition. In addition, by restricting the address addition range to the intermediate order k bits of the first structured address, incorrect addresses are not accessed, and the device can flexibly cope with the size of the data structure.

BRIEF DESCRIPTION OF THE DRAWINGS

These and other objects, features, and advantages of the present invention will become more apparent from the following description of the preferred embodiment taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limitations thereof.

An embodiment of the present invention will now be explained, based on the drawings.

PRINCIPLE OF THE PRESENT INVENTION

In a conventional communication device, a processor such as a network control processor outputs an base address and an offset in the one clock cycle, then the base address is added to the offset to get a target address for an output memory device in a next cycle. For this reason, there is a minimum of two clock cycles for getting the target address. Furthermore, a propagation time is required for propagating a carry when an address addition operation is executed. As a result, data access operation is slow.

The principle of the device for generating structured addresses according to the present invention is that when a plurality of items of data with homogeneous data configuration is processed, address addition within the network control processor is made unnecessary. By adding the base address to addresses created by the network control processor, and by using a process in which the address is transferred from the network control processor to a memory device, there is substantially no time delay in the address addition, and by restricting the address addition range, incorrect addresses are not accessed, and the device can flexibly cope with the size of the data structure.

BASIC EMBODIMENT

Accessing for Data Structure of a Same Size by Using the First Address Data ADR1

Figure 2:
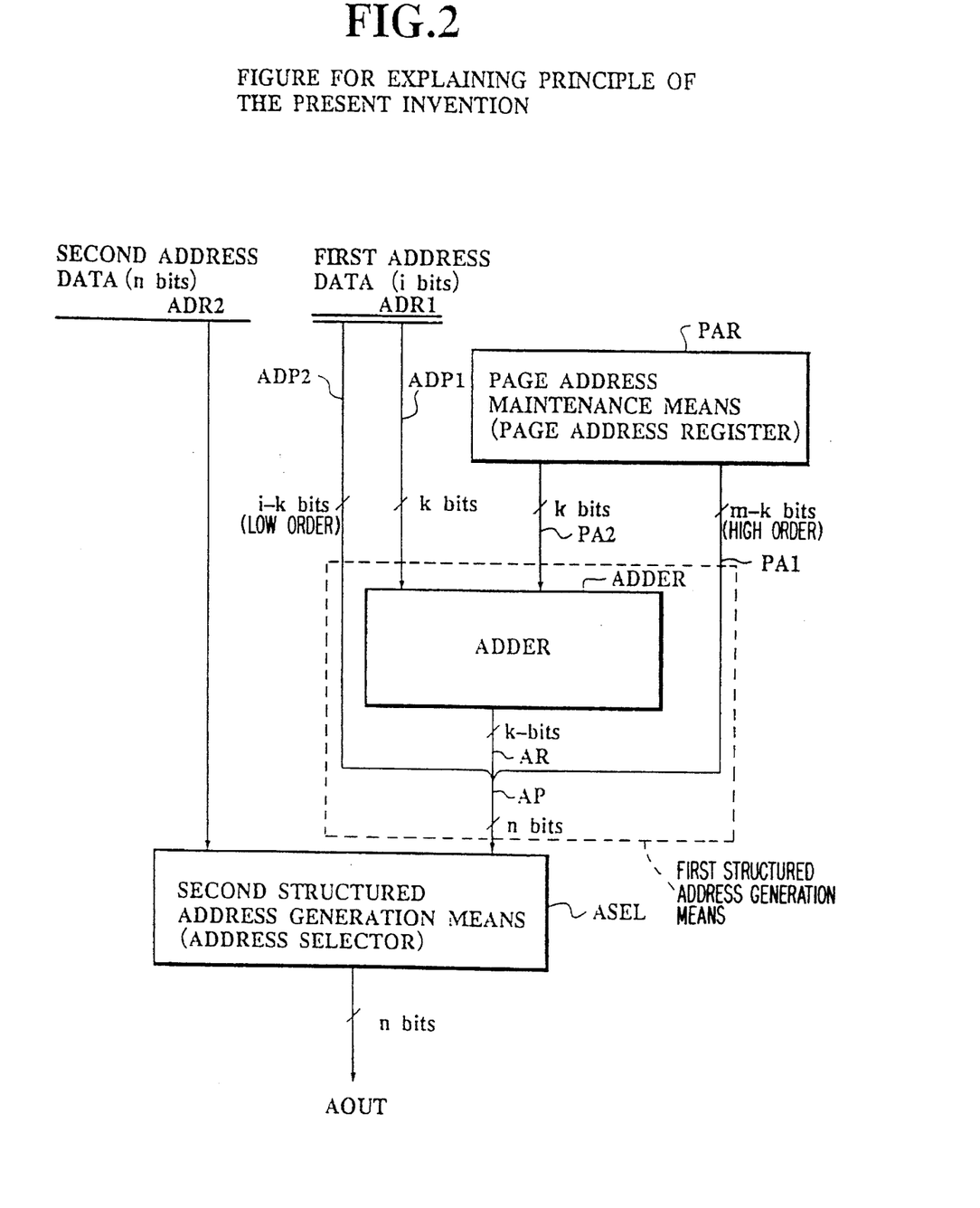
FIG. 2 is a drawing illustrating the principle of the present invention, representing a configuration drawing of a device for generating structured addresses relating to an embodiment of the present invention.

FIG. 2 is a configuration drawing of device for generating structured addresses related to a preferred embodiment of the present invention.

In this drawing, the embodiment comprises a page address register PAR as a page address maintenance means which maintains the page addresses of a memory device; an adder ADDER as a first structured address generating means for generating a first structured address AP from first address data ADR1 and the contents of the page address register PAR; and an address selector ASEL as a second structured address generating means for converting the output from the adder ADDER to second address data ADR2 which is made up of n bits and outputting the result as a second structured address AOUT. For example, the address selector ASEL selects the output of the adder ADDER when data from the first address data ADR1 is effective, and selects the second address data ADR2 when data from the second address data ADR2 is effective.

Further, the first address data ADR1 is made up of i bits, and, in addition to showing the address value, it is provided with a control signal which shows whether or not the first address is valid. This input data, the first address data ADR1, is divided into a ADP1 bus of a high-order k bits width and a ADP2 bus of a low-order i-k bits width. Also, the second address data ADR2, in addition to showing the address value of a width of n bits, is provided with a control signal which shows whether or not the second address is valid.

The page address register PAR, which is a maintenance or holding register, is previously set at an address value of m bits by a means not shown in the drawing. The output of the register PAR is divided between a PA1 bus of a high-order m-k bits width and a PA2 bus of a low-order k bits width. The low-order PA2 of the page address register PAR and the high-order ADP1 of the first address data unit ADR1 are connected to the ADDER as the first and second inputs of the adder ADDER and the output of the ADDER become an AR bus of k bits width. Furthermore, a carry produced from the results of the addition is discarded.

The first structured address AP has a width of n bits. The high-order m-k bits thereof are connected to the high-order PA1 of the page address register PAR; the intermediate-order k bits thereof are connected to the additive result AR of the low-order PA2 of the page address register PAR and the high-order ADP1 of the first address data ADR1; and the low-order i-k bits thereof are connected to the low-order ADP2 of the first address data ADR1, respectively. The address selector ASEL has a first and a second input of a width of n bits each, connected to the first structured address AP and the second address data ADR2 respectively. When the second address data ADR2 is valid, the contents of the ADR2 bus are the output of the selector ASEL. When the second address data ADR2 is not valid, the contents of the AP bus are the output of the selector ASEL. The selector ASEL is controlled to select either the address ADR2 or the address AP by using one bit in the address data provided from a network control processor, for example. This will be explained later in detail. This output of the selector ASEL becomes the AOUT bus of a width of n bits.

In the above configuration the following relationships are formed.

$$m > k$$

$$i > k$$

$$n = (m - k) + k + (i - k) = m + i - k$$

Here, for ease of explanation for the embodiment, the following numerical values are assigned as the bus widths:

$$m=12 \text{ bits, } i=8 \text{ bits, } k=4 \text{ bits, } n=16 \text{ bits.}$$

Next, the operation of an embodiment with the above configuration will be explained.

Figure 3:
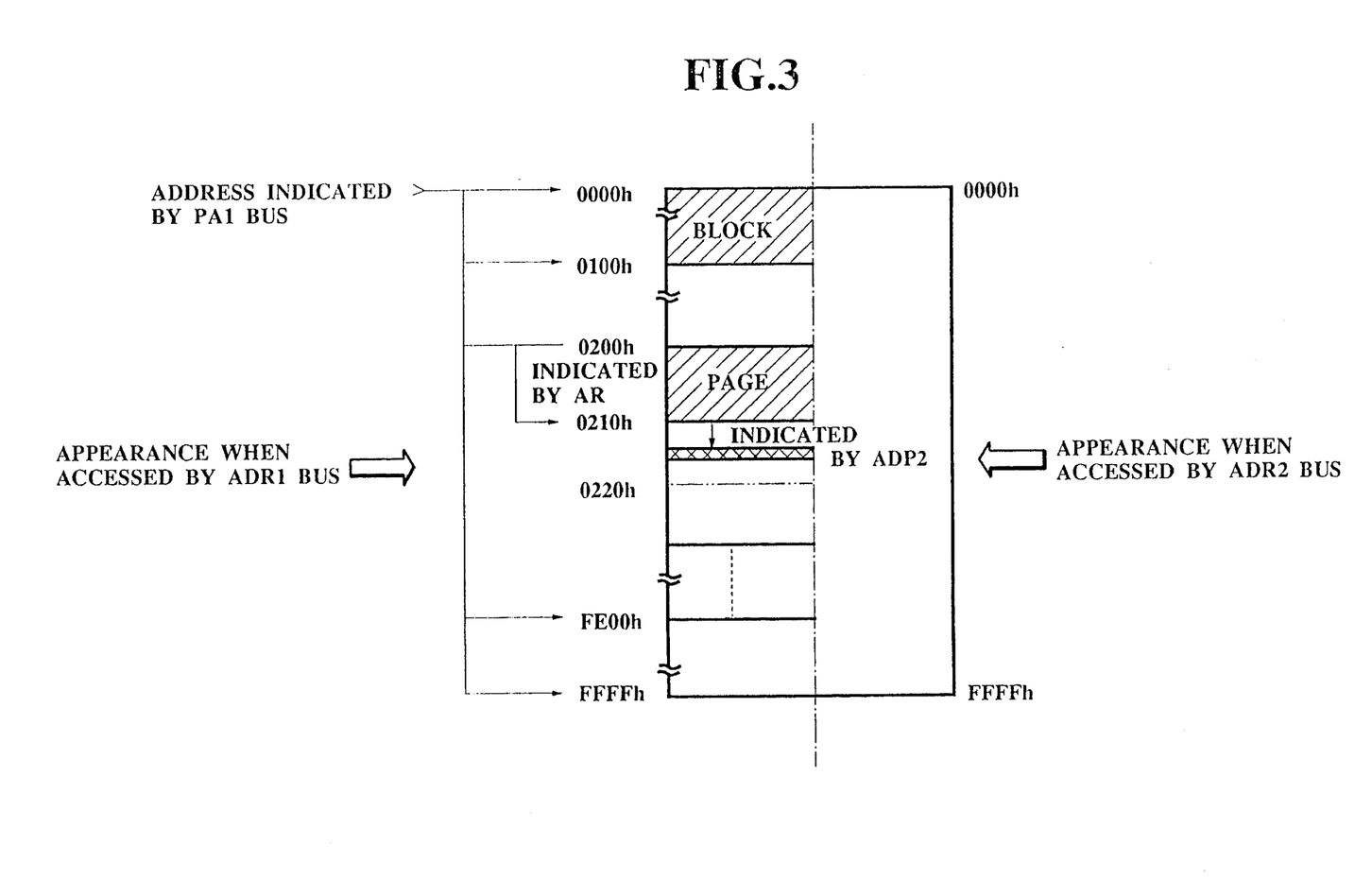
FIG. 3 is a drawing for explaining the address space of a memory device which is accessed by the structured address device relating to an embodiment of the present invention.

FIG. 3 shows the memory space of a memory device which is accessed by the AOUT bus. In the drawing, the left half demarked by a single point chain line shows the appearance of the address space when accessed by the ADR1 bus; the right half shows the appearance of the address space when accessed by the ADR2 bus. The total range of the AOUT bus is 65536 addresses, from 0000h to FFFFh. The character "h" indicates hexadecimal units. A unit of data accessed from these addresses is known as a word. Accordingly, the data accessed by the AOUT bus is 65536 words, specifically, approximately 64K words.

When the second address data ADR2 is valid, the address selector ASEL outputs the contents of the ADR2 bus to the AOUT bus, for example. Also, when the first address data unit ADR1 is valid, the address selector ASEL outputs the contents of the AP bus to the AOUT bus. At this time, the high-order (m-k)=8 bits of the AOUT bus are equivalent to the PA1 bus and become a fixed value output by the page address register PAR. Accordingly, this indicates one region (referred to as a block) as one of 256 parts into which 64K words are divided. Also, the intermediate k=4 bits of the AOUT bus are equivalent to the AR bus, and this indicates one region (referred to as a page) as one of regions, each including 16 words, into which one block is divided. Further, the low-order (i-k)=4 bits of the AOUT bus are equivalent to the ADP2 bus and show one word in a page.

Figure 4:
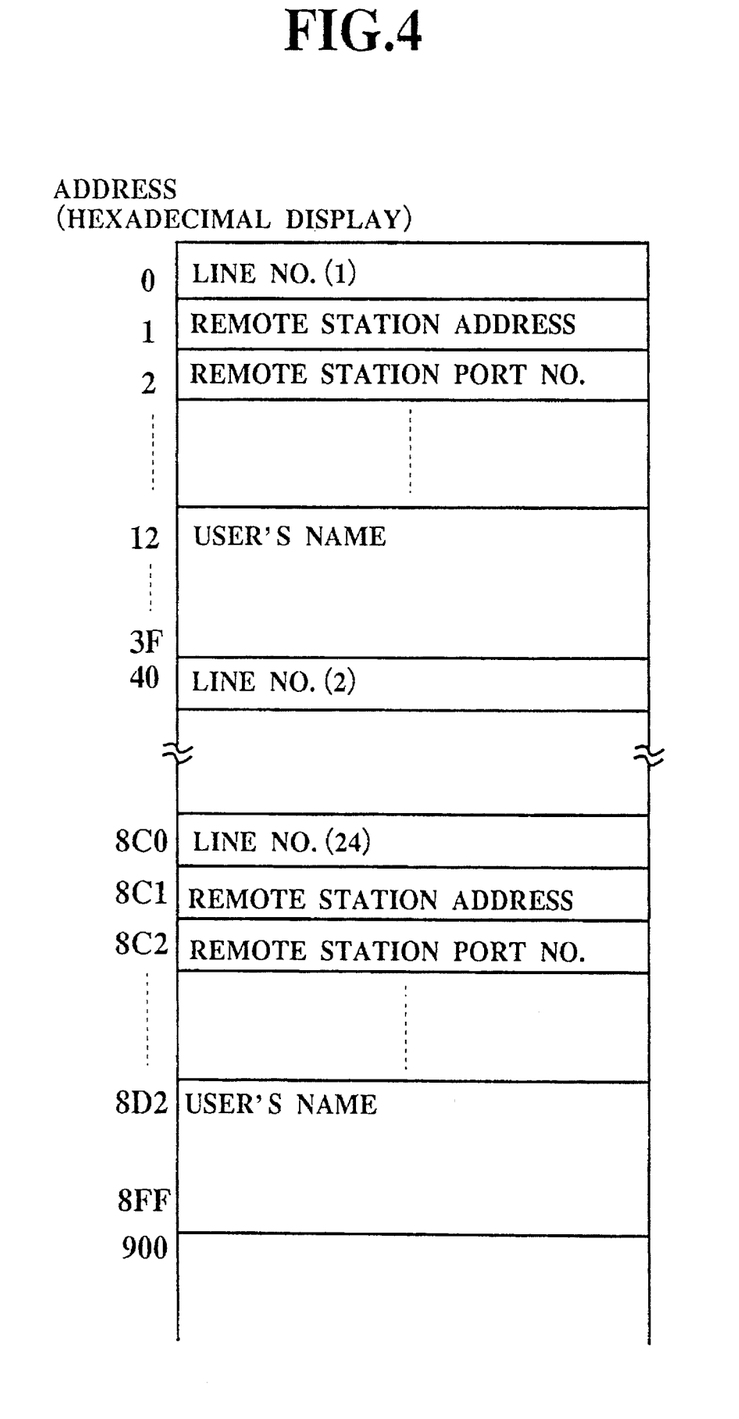
FIG. 4 is a chart for explaining a second example of an embodiment of a control data structure of the present embodiment of a control data structure of the present invention.

Next, a more specific operation will be explained by an example in which data which controls a communication line with a data configuration as shown in FIG. 1 and FIG. 4 is accessed.

By combining three types of data items—the physical address and the logical port number of the remote station, and the logical port number of the local station, it is possible to determine the specific communication line. When transmitting or receiving data using this communication line, the transferred/received data is controlled by providing respective sequence numbers to detect duplicating and truncating of data, or the like. In addition to this, data and the like is required to identify the state of the communication line. These data units have a fixed value for each communication line and show the special feature of having the same data structure.

When the size of the control data structure is 16 words as shown in FIG. 1, up to a maximum of 4096 pieces of data in a 64K word region are arranged in the addresses 0000h, 0010h, 0020h . . . and the like. Accordingly, 12 bits of data are necessary to specify one unit of control data, and the address data for this is set in 12 bits of the page address register PAR. In addition, the included data can be specified with an address of 4 bits, and the address data output to the ADR1 bus is 00h to 0Fh.

Here, taking as an example the case where a reception sequence number which is the number 124h in the communication line is accessed, the head address of this data is the 1230h address, and the reception sequence number has a +5 offset so that 123h is set in the page address register PAR, and the first address data unit ADR1 is 05h. At this time, the values in the respective buses are as follows: PA1 bus=12h, PA2 bus=3h, ADP1 bus=0h, ADP2 bus=5h, and AR bus= PA2 bus+ADP1 bus=3h. Accordingly, the AP bus=1235h, and because the output AOUT of the address selector ASEL=1235h, the address data is accessed. In the same manner, for the sixth data item of the ABC'th page, AOUT= ABC6h, and the address data is accessed.

Next, an explanation will be provided using the access operation of FIG. 4 in the case where the name of the user is further provided to the control data of FIG. 1, and 64 words are added to the size of the control data structure. Here, the name of the user is stored from the +12 address, and it is possible to arrange a maximum of 1024 pieces of this new control data within 64K. In the case where this data is posted in addresses 0040h, 0080h, and the like, the page address register PAR is set at the values 004h, 008h and the like, while address data in the range of 00h to 3Fh is set as the first address data.

In the case where the user's name for the 24h'th item of control data (data head address is 08C0h address) is accessed, 08Ch is set in the page address register PAR and 12h is set in the ADR1 bus. At this time, the values in the respective buses are as follows: PA1 bus=08h, PA2 bus=Ch, ADP1 bus=1h, ADP2 bus=2h, and AR bus=PA2 bus+ADP1 bus=Dh. Accordingly, the AP bus=08D2h, and because the output AOUT of the address selector ASEL=8D2h, the data for the address for the user's name is accessed.

Figure 5:
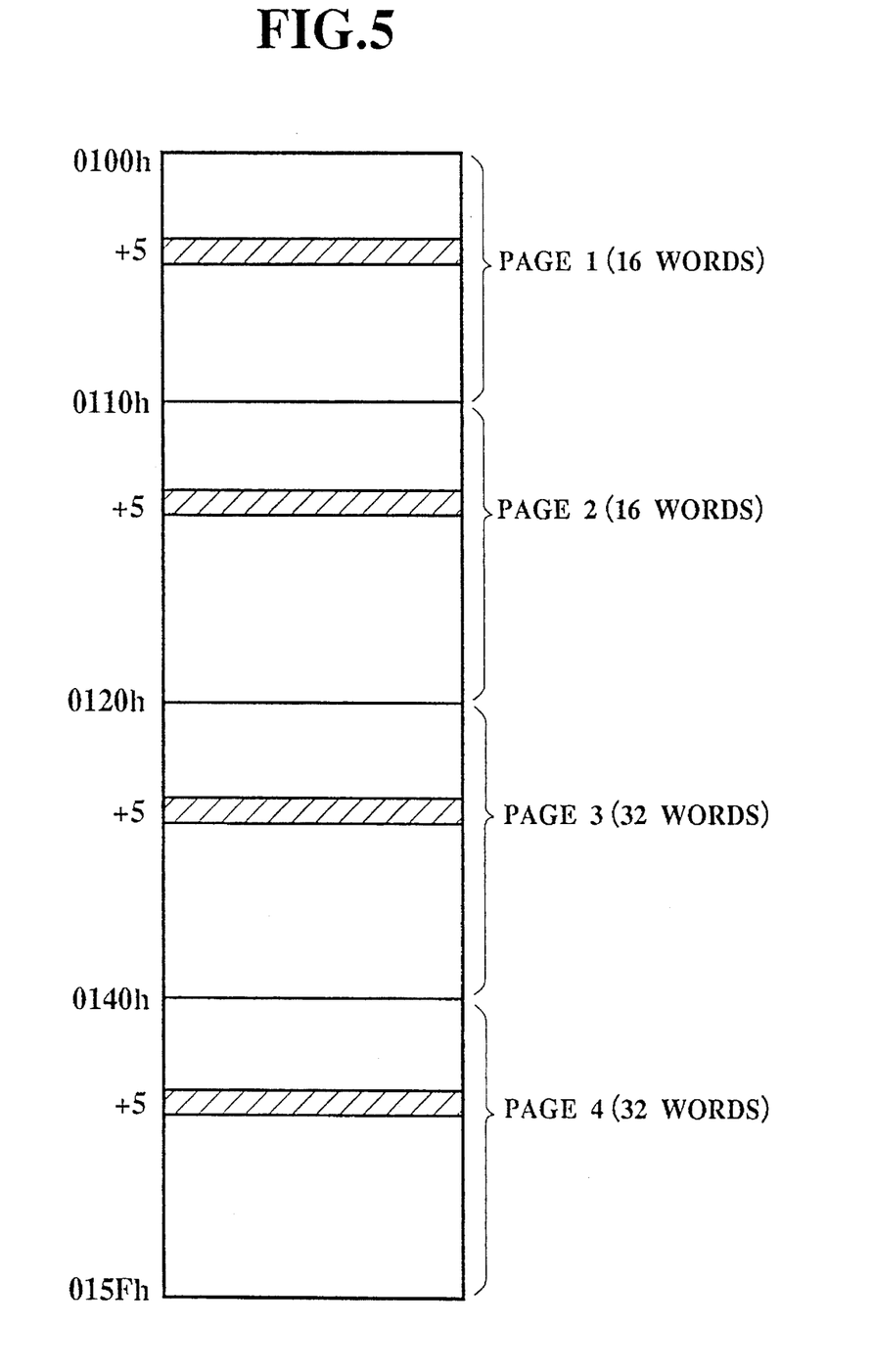
FIG. 5 is a chart for explaining a third example of an invention.

Accessing for Data Structure of Several Different Sizes by Using the First Address Data Next, an explanation will be given for the case where control data with data structures of several different sizes is provided. FIG. 5 illustrates the case where control data structures of 16 words and 32 words are arranged in order, two items at a time, from the address 0100h. The head addresses of these data items are respectively 0100h, 0110h, 0120h, and 0140h. When the 5th word of the respective items of control data is accessed, the page address register PAR is set at the values 010h, 011h, 012h, and 014h, while 05h may be set as the first address data ADR1. Specifically, the intermediate 4 bits of the AOUT bus are added using the adder ADDER so that, even in the case where control data items of different sizes are arranged, no hardware changes are required and uniform control is possible.

In short, when data is accessed, the page address of control data pertaining to that data is obtained and set in the page address register PAR. Following this, by merely setting an address which shows the order of the control data into the first address data ADR1 the object physical address can be obtained.

In addition, an address calculated by the adder ADDER must be limited to the intermediate 4 bits, and in the case where an incorrect address is set into the first address data ADR1 by an unsuitable program, because the carry is eliminated, the address high-order m-k bits is fixed by the page address register PAR during the access operation so that a range which can be accessed is limited to one specified block. Accordingly, the data in other blocks is not destroyed, thereby simplifying program debugging.

ACCESSING FOR DATA STRUCTURE BY USING THE SECOND ADDRESS DATA ADR2

On the other hand, when this type of control data is transferred completely to another memory device, or, there is no structured address or the object is to debug the program or the like, it is desirable to be able to directly designate the respective data in word units. In such a case, if the address data is not set in the first address data unit ADR1 but is set in a 16-bit address of the second address data unit ADR2, it is possible to output a 16-bit address to the AOUT bus.

A PREFERRED EMBODIMENT OF A CONFIGURATION OF THE DATA PROCESSING DEVICE INCLUDING THE MEANS FOR GENERATING STRUCTURED ADDRESS

Figure 6:
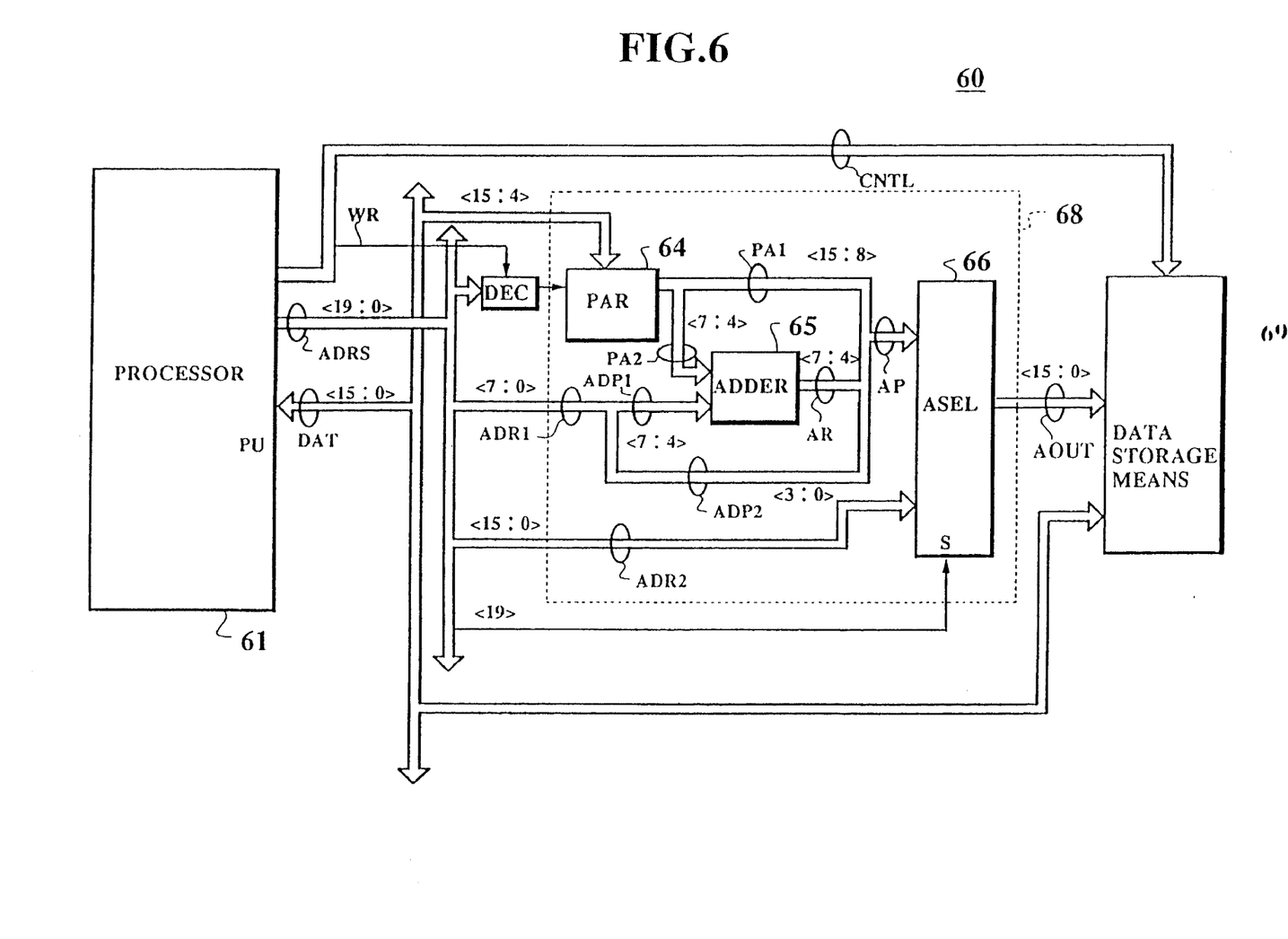
FIG. 6 a configuration drawing of a data processing device relating to an embodiment of the present invention.

FIG. 6 is a configuration drawing of a data processing device incorporating the device 68 for generating structured addresses of the present invention, a processor (PU) 61 such as a network control processor, and a data storage means 69 as a memory device.

In the drawing, the processor 61 is connected to an address bus ADRS which outputs an address of 20 bits <19:0> in width, a data bus DAT with a 16-bit <15:0> width, and a control bus CNTL which designates write-in and operation timing. Here, the width and bit position of each bus is shown by the notation <n:m>, indicating from the n-th bit to the m-th bit. The bit position of one signal is indicated by the notation <n>.

The structured address AOUT <15:0>, the data bus DAT for input/output of data, and the control bus CNTL are connected to inputs of the data storage means.

In addition, the low-order 8 bits <7:0> of the address bus ADRS are connected to the first address data ADR1, and the low-order 16 bits <15:0> of the address bus ADRS are connected to the second address data ADR2. ADRS <19>= "0" indicates that the first address data ADR1 is valid; ADRS <19>="1" indicates that the second address data ADR2 is valid. Specifically, the ADRS <19> is connected to a selection control terminal S of the address selector (ASEL) 66.

The address specified in the address bus ADRS is output to a decoder (DEC) 62, which judges whether or not a control signal WR indicating "write" is valid, and designates that data output to the data bus DAT <15:4> be set in the page address register (PAR) 64.

Because of the configuration outlined above, the processor (PU) 61 sets a suitable value in the page address register (PAR) 64, and when 256 words from address 00000h to 000FFh are accessed, ADRS <19>="0", the address selector (ASEL) 66 selects the structured address AP and outputs it to the AOUT bus <15:0>. Specifically, the processor (PU) 61 accesses the memory device 69 as the data storage means from a structured address.

On the other hand, when 64K words from address 80000h to 8FFFFh are accessed, ADRS <19>="1", and the address selector (ASEL) 66 selects the second address data ADR2 and outputs it to the AOUT bus <15:0>. Specifically, the processor (PU) 61 accesses the memory device 69 as the data storage means from an unstructured address.

From the example in FIG. 5, one part of the address data ADRS, the ADRS <19>, output by the processor (PU) 61 is used to show whether the address input from the device for generating structured addresses is valid or invalid, but this is not is the only possible method. In a data processing device in which it is possible to differentiate the access to the memory device 69 as the data storage means 69 and the access to the I/O (Input/Output) device (not shown), it is possible to use a control signal to make this differentiation. For example, when the memory device is accessed, it is possible to validate the second address data ADR2 and when the I/O device is accessed, to validate is validated the first address data ADR1 is validated.

In addition, it is possible to use an extremely high speed adder as the adder 65 used as a first structured address generating means in this embodiment, because a narrow bit width (one part of the ADRS bus) is input with respect to the width of the address bus ADRS output by the processor (PU) 61. Specifically, access is possible without extending the bus cycle, because it is also possible to complete address calculations from address data directly outputted to the address bus ADRS. Therefore high speed processing can be provided.

Figure 7:
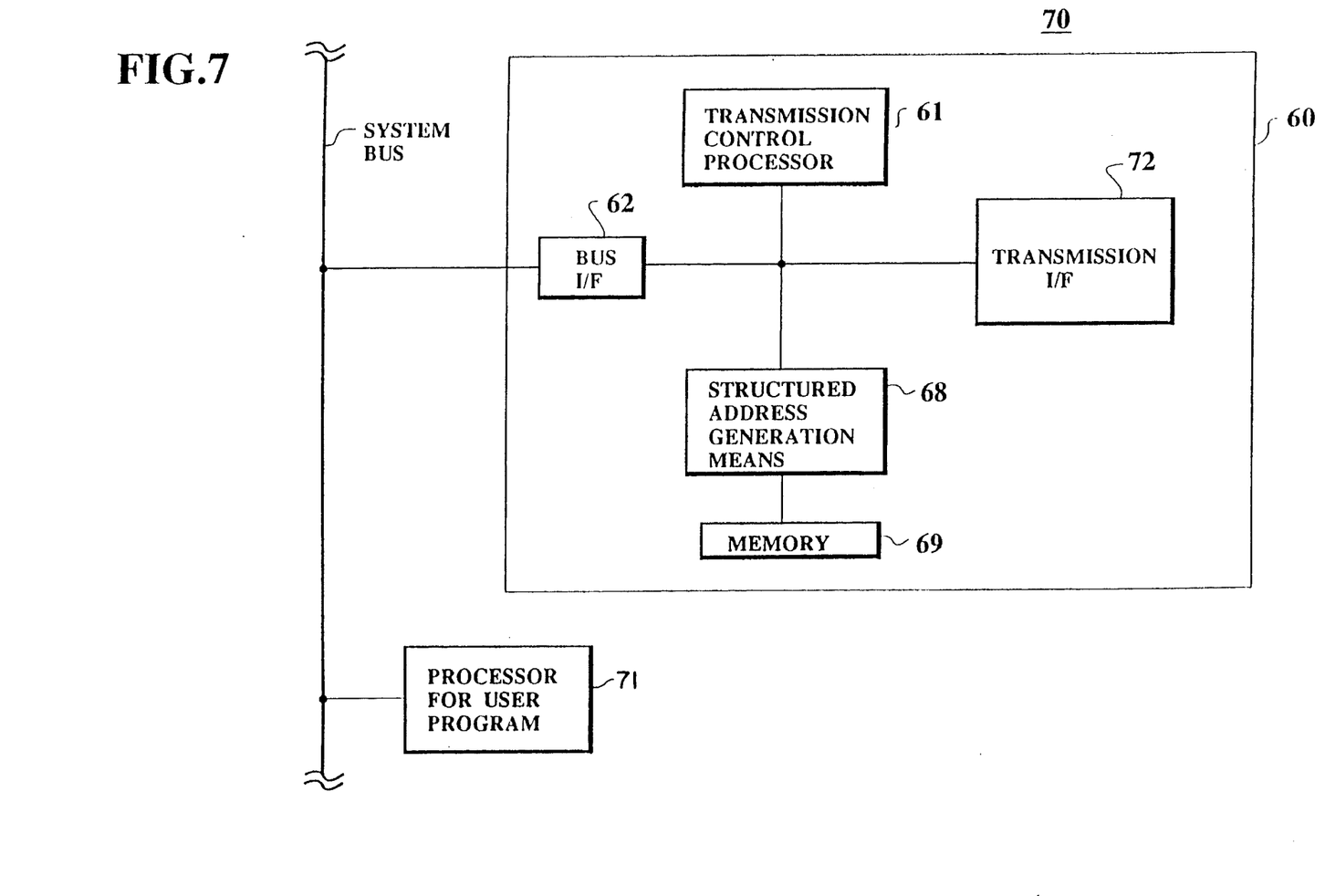
FIG. 7 is a configuration of a data communication system having a control data structure of the present invention.

FIG. 7 shows a configuration drawing for a data communication system formed on one chip. In this drawing, the number 60 indicates the data processing device shown in FIG. 6, 61 denotes the transmission control processor, 62 indicates the bus interface, 68 indicates the structured address generation means, 69 indicates the data storage means, 71 indicates a general purpose processor for a user program, and 72 indicates a transmission interface.

Thus, the data processing device 60 as the device for generating structured address can be formed on one chip to form a data communication system.

In addition, for the present embodiment, examples were given relating to control data for the communication line, but there are not limitations of the present invention. This embodiment exhibits effectiveness with respect to applications for which the data structure is uniform, such as tasks in real time processing and the like. In particular, if the present invention is applied to a data processing device which is made for special applications such as ASIC, this effect is enlarged.

Because it is possible to eliminate the work involved in calculating addresses from the program in the processor when the data structure is dealt with, not only is it easy to draw up the program, but execution time can be shortened.

In the case where address calculations are performed with the processor hardware, even when using a high speed adder, a minimum of one clock cycle processing time is required because calculations are carried out for all the bits in a normal address. However, by using the present invention, the calculations can be done in less than one clock cycle because an adder with a small bit width used. For this reason, it is possible perform calculations for an address which is output to the memory device from the processor, and an extra clock cycle for address calculation is unnecessary. Specifically, compared to conventional methods, each cycle of data access can be shortened by at least one clock cycle. In particular, when control data is maintained as a table such as a communication control program or the like, and an essential element within the table which specifies a series of treatments is accessed repeatedly, a page address which designates the table may be set once, after which it is merely necessary to output an offset value to the address bus. As a result, the data access process speed can be improved.

Because the position of the bit which performs address calculations is restricted to the intermediate-order k bits of the first structured address, access cannot be made outside the address range specified by the high-order bit.

In addition, data structures of a variety of sizes can be handled without modification of the hardware by the use of an adder as the first structured address generating means.

Further, because the configuration is such that the memory device is accessed by means of a second structured address, specifically, a non-structured address, it is effective when it is desired to access an unrelated data structure, for example, transmission or the like of data from a continuous region, or when a program is debugged, or the like, or when directly reading out the contents of a memory device.

The present invention can provide a device for generating structured addresses wherein when a plurality of items of data with the same data configuration is processed, address addition within the processor is made unnecessary by adding a base address to addresses created by a processor. When addition is performed by a process in which the address is transferred from the processor to a memory device, there is substantially no time delay in the address addition. In addition, by restricting the address addition range, incorrect addresses are not accessed, and the device can flexibly cope with the size of the data structure.

What is claimed is:

1. A device for generating structured addresses indicating an address position in one of a memory and an Input/Output (I/O) unit to be accessed, said device receiving address data comprising a first address of i bits (i is a positive integer, high order k bits, low order i-k bits, k is a positive integer), a second address of n bits (n is a positive integer), and a control bit indicating which of said first address and said second address is valid, comprising:

(a) page address storage means for storing a page address of m bits (m is a positive integer, high order m-k bits, low order k bits) of each of a plurality of pages dividing said memory;
    (b) first structured address generation means for receiving said first address and a page address from said page address storage means, for adding only said high order k bits of said first address to only said low order k bits of said page address, and for generating a first structured address of n-bits comprising the high order m-k bits of said page address, intermediate order k bits made from a result of said addition, and said low-order i-k bits made from the low order i-k bits of said first address; and
    (c) second structured address generation means for selecting one of said first structured address and said second address based on said control bit to generate a second structured address, and for transmitting said second structural address to one of said memory and said I/O unit, wherein when said first address is valid, said second structured address generation means transmits said first structured address, and when said second address is valid, said second structured address generation means transmits said second address.

2. A device for generating structured addresses as claimed in claim 1, wherein said first structured address generation means comprises an adder.

3. A device for generating structured addresses as claimed in claim 1, wherein said page address storage means comprises registers.

4. A device for generating structured addresses as claimed in claim 1, wherein said device receives said address data from an address bus and said page address storage means receives said page address from a data bus, said device being coupled with a processor for executing instructions through said address bus and data bus.

5. A device for generating structured addresses as claimed in claim 4, further comprising a decoder connected to said page address storage means and said address bus for decoding said address data in order to determine if said page address is output onto said data bus and outputting a control signal to said page address storage means which receives said page address from said data bus in response to said control signal.

6. A data processing device comprising:

(a) a device for generating structured addresses indicating an address position to be accessed, said device for generating structured addresses receiving address data comprising a first address of i bits (i is a positive integer, high order k bits, low order i-k bits, k is a positive integer), a second address of n bits (n is a positive integer) and a control bit indicating which of said first address and said second address is valid, said device for generating structured addresses comprising:
        (1) page address storage means for storing a page address of m bits (m is a positive integer, high order m-k bits, low order k bits) of each of a plurality of pages;
        (2) first structured address generation means for receiving said first address and a page address from said page address storage means, for adding only said high order k bits of said first address to only said low order k bits of said page address, and for generating a first structured address of n bits comprising the high order m-k bits of said page address, intermediate order k bits made from the result of the addition, and said low-order i-k bits made from the low order i-k bits of said first address; and
        (3) second structured address generation means for selecting one of said first structured address and said second address based on said control bit to generate a second structured address and for transmitting said second structured address, wherein when said first address data is valid, said second structured address generation means transmits said first structured address, and when said second address data is valid, said second structured address generation means transmits said second address;
    (b) a data memory for storing data addressed by said second structured address transmitted from said second structured address generation means; and
    (c) a network control processor for controlling the operations of said device for generating structured addresses, wherein said device for generating structured addresses, said data memory, and said network control processor are formed on a single semiconductor chip.

7. A data communication system for executing a program, comprising:

(a) a device for generating structured addresses indicating an address position in one of a memory and an Input/Output (I/O) unit to be accessed, said device for generating structured addresses receiving address data comprising a first address of i bits (i is a positive integer high order k bits, low order i-k bits, k is a positive integer), a second address of n bits (n is a positive integer) and a control bit indicating which of said first address and said second address is valid, said device for generating structured addresses comprising:

(1) page address storage means for storing a page address of m bits (m is a positive integer, high order m-k bits, low order k bits) of each of a plurality of pages;

(2) first structured address generation means for receiving said first address and a page address from said page address storage means, for adding only said high order k bits of said first address to only said low order k bits of said page address, and for generating a first structured address of n bits comprising the high order m-k bits of said page address, intermediate order k bits made from the result of the addition, and said low-order i-k bits made from the low order i-k bits of said first address; and (3) second structured address generation means for selecting one of said first structured address and said second address based on said control bit to generate a second structured address, and for transmitting said second structured address to one of said memory and said I/O unit, wherein when said first address data is valid, said second structured address generation means transmits said first structured address, and when said second address data is valid, said second structured address generation means transmits said second address;

(b) general purpose processor for executing said program; and (c) a system bus for connecting said device for generating structured addresses with said general purpose processor, wherein said device for generating structured addresses, said general purpose processor, and said system bus are formed on a single semiconductor chip.

\* \* \* \* \*